(12) United States Patent
Kumar et al.

(10) Patent No.: US 9,961,747 B2
(45) Date of Patent: May 1, 2018

(54) CONTROL OF A LIGHTING SYSTEM

(71) Applicant: PHILIPS LIGHTING HOLDING B.V., Eindhoven (NL)

(72) Inventors: Sandeep Shankaran Kumar, Waalre (NL); Ashish Vijay Pandharipande, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 39 days.

(21) Appl. No.: 14/913,778

(22) PCT Filed: Jul. 23, 2014

(86) PCT No.: PCT/IB2014/063340
§ 371 (c)(1),
(2) Date: Feb. 23, 2016

(87) PCT Pub. No.: WO2015/025235
PCT Pub. Date: Feb. 26, 2015

(65) Prior Publication Data
US 2016/0205746 A1    Jul. 14, 2016

(30) Foreign Application Priority Data
Aug. 23, 2013   (EP) .................................. 13181579

(51) Int. Cl.
*H05B 37/02*     (2006.01)
*H05B 33/08*     (2006.01)

(52) U.S. Cl.
CPC ..... *H05B 37/0227* (2013.01); *H05B 33/0848* (2013.01); *H05B 33/0854* (2013.01); *H05B 37/0218* (2013.01); *H05B 37/0272* (2013.01)

(58) Field of Classification Search
CPC ........... H05B 37/0227; H05B 33/0815; H05B 37/0218; H05B 33/0848; H05B 33/0854;
(Continued)

(56) References Cited

U.S. PATENT DOCUMENTS 5,721,583 A * 2/1998 Harada .............. H04N 7/17354
                                              348/E7.075
5,905,442 A * 5/1999 Mosebrook ........ G05B 19/0423
(Continued)

FOREIGN PATENT DOCUMENTS

CN      102103670 A      6/2011
CN      102273323 A      12/2011
(Continued)

*Primary Examiner* — Vibol Tan
(74) *Attorney, Agent, or Firm* — Meenaskshy Chakravorty

(57) ABSTRACT

The disclosure relates to a lighting system which can be controlled from a wireless device in dependence on complying with an access rule that the wireless device is determined to be within in a spatial region associated with the lighting system. The disclosure provides apparatus for securing against the lighting system being controlled from a device located outside the relevant region via a rogue relay device located in that region. The apparatus comprises a user location module configured to determine user location information indicative of whether a user is accompanying the wireless device in the region associated with the lighting system, and an access module which is configured with a further access rule: that it does not allow the control of the lighting system by the wireless device if the user location information is indicative of the wireless device being unaccompanied by a user.

15 Claims, 3 Drawing Sheets

(58) Field of Classification Search
CPC .. H05B 37/0272; H04W 4/023; H04W 4/043; H04W 64/00; H04W 52/0225; H04W 12/02; H04W 4/02; H04W 88/02; G01S 15/04; G01S 7/524; G01S 7/526; H04L 12/282; H04L 2012/2841; H04L 61/6081; H04L 67/22
USPC ........... 315/291–311; 340/2.24, 825, 825.06, 340/825.69, 538
See application file for complete search history.

(56) References Cited

U.S. PATENT DOCUMENTS

| | | | | |
|---|---|---|---|---|
| 6,720,874 | B2* | 4/2004 | Fufido | G07C 9/00031 340/5.2 |
| 7,852,205 | B2 | 12/2010 | Huseth et al. | |
| 7,904,074 | B2* | 3/2011 | Karaoguz | H04L 12/2803 455/418 |
| 7,966,021 | B2 | 6/2011 | Dietrich et al. | |
| 8,880,047 | B2* | 11/2014 | Konicek | H04M 1/72513 455/414.1 |
| 9,766,327 | B2* | 9/2017 | Pandharipande | H05B 33/0815 |
| 9,838,993 | B2* | 12/2017 | Pandharipande | H04W 64/00 |
| 2006/0044152 | A1* | 3/2006 | Wang | H04L 12/2803 340/2.24 |
| 2011/0140864 | A1 | 6/2011 | Bucci | |
| 2012/0184299 | A1 | 7/2012 | Loveland et al. | |
| 2013/0127591 | A1 | 5/2013 | Shay et al. | |
| 2014/0285113 | A1* | 9/2014 | Huang | H05B 37/0272 315/297 |

FOREIGN PATENT DOCUMENTS

| | | |
|---|---|---|
| CN | 102291886 A | 12/2011 |
| WO | 2004023849 A1 | 3/2004 |
| WO | 2010092510 A1 | 8/2010 |
| WO | 2011151796 A1 | 12/2011 |
| WO | 2012085794 A1 | 6/2012 |
| WO | 2012090122 A1 | 7/2012 |
| WO | 2014060920 A1 | 4/2014 |

* cited by examiner

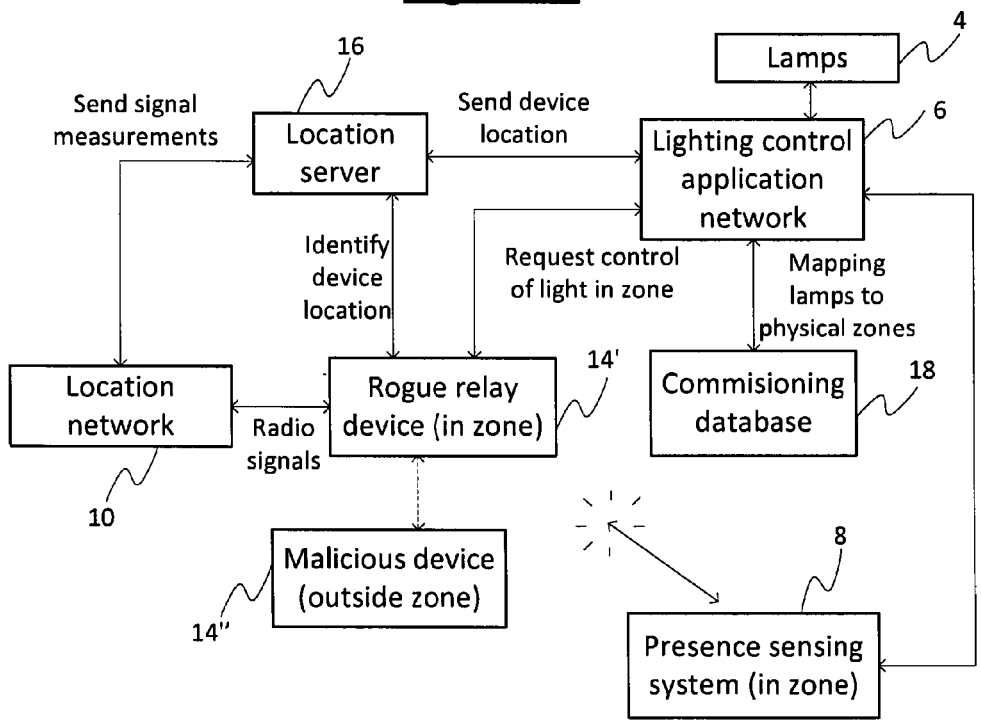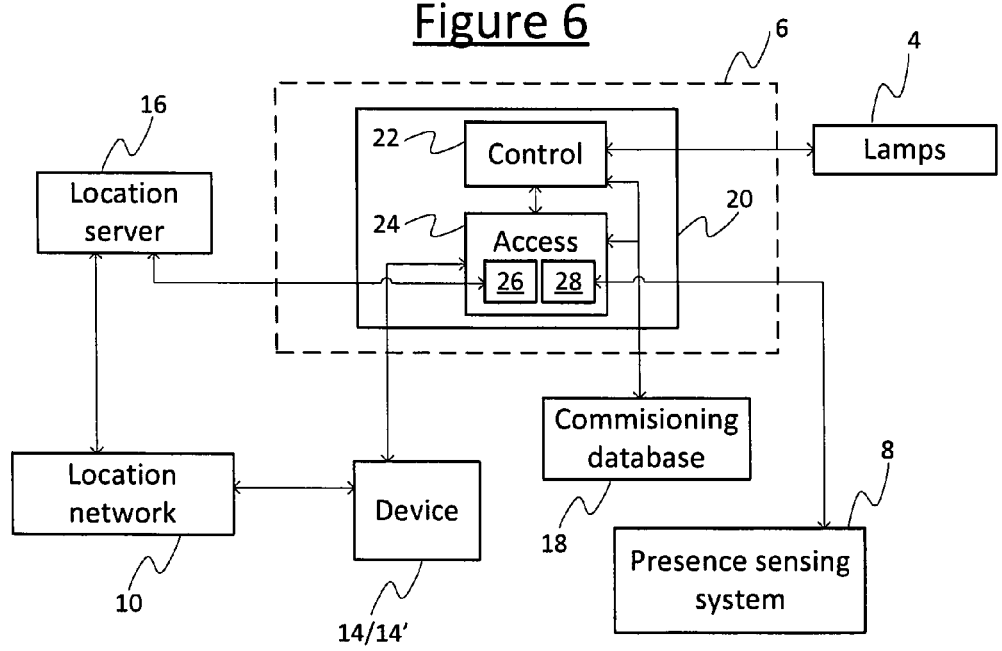

CONTROL OF A LIGHTING SYSTEM

CROSS-REFERENCE TO PRIOR APPLICATIONS

This application is the U.S. National Phase application under 35 U.S.C. § 371 of International Application No. PCT/IB2014/063340, filed on Jul. 23, 2014, which claims the benefit of European Patent Application No. 13181579.7, filed on Aug. 23, 2013. These applications are hereby incorporated by reference herein.

TECHNICAL FIELD

The present disclosure relates to the control of a lighting system from a wireless device.

BACKGROUND

Indoor positioning refers to techniques whereby the position of a wireless user device can be determined with respect to a location network comprising multiple anchor radios, the anchors being wireless nodes whose positions are known a priori (typically being recorded in a location database). Various measurements of the signals transmitted between the mobile device and anchor nodes may be employed to obtain the device's position, such as the RSSI (receiver signal strength indicator), ToA (time of arrival) and AoA (Angle of arrival). The determination of the device's position may be achieved using measurements made and processed at the device (a "device-centric" implementation) or using measurements made and processed at the location network (a "network-centric" implementation).

In the context of lighting systems, one application of indoor positioning is to automatically provide a wireless mobile device with access to control of the lighting system when that mobile device is found to be positioned in a particular spatial region associated with the lighting. For instance, access to control of the lamps in a room may be provided to a wireless user device if the device is found to be positioned inside that room and requests access. Once a wireless user device is positioned and determined to be within a valid region, control access is provided to that device via a lighting control network.

WO2004/023849 discloses a lighting control system and a method of controlling lights that involves two-way wireless communication, wherein the two-way wireless communication is used for pairing a remote control device to one or more ballasts of the lighting system.

US2011/0140864 discloses a system and method for identifying and categorizing distributed devices, that involves localization of a device and the association of an identifier with the device. The method involves a portable programming tool sending a low-power discovery message to the distributed devices. The devices in range respond with identification information. The portable programming tool organizes the responses based on proximity and sends a "flash" message to the device closest. In response that device responds and the user confirm that this is the device that he intended and can store the identifier and e.g. location of the device for later use, such as load shedding or the reduction of power consumption.

SUMMARY

Location-based control of a lighting system may seem like a benign application with little potential for abuse. However, it is recognized herein that a particular security threat exists in that a malicious party may try to control lighting when that party is not validly located in the relevant region, such as the room being lit. The malicious party may thus cause harm, disruption or nuisance to legitimate users such as the occupants of the room, owner of the building or organizer of an event, etc. For instance a malicious party could expose occupants to danger by turning off the lights when a room is occupied; or could induce panic, lost productivity or illness such as nausea or epilepsy by controlling the lights erratically; or could deliberately waste resources by turning on the lights when a room is unoccupied.

The reason why location-based access is insecure is that the user seeking control can be a spatially separate entity than the wireless device whose position is determined in order to grant access. Furthermore, the access control commands and the location-based service control program may be temporally separated. Thus it is possible for a malicious, outside party to gain unauthorized access by introducing a rogue relay device into the control region, e.g. into the room whose lighting is to be controlled. From the perspective of the location network, the relay device is validly located to allow access. However, the relay device may be left permanently or semi-permanently in the room while the malicious party transfers the control access rights to a rogue device outside the room (or other such authorized control region). This enables the malicious party to gain outside access to the lighting control network using the rogue device via the relay. Another possibility would be that a malicious user leaves behind a rogue device pre-programmed to send out malicious control commands.

Techniques like distance bounding would not obviate the threat in this scenario, because the rogue relay device would be correctly distance-bound to be within the authorized region of control while the malicious user and device can still control the lighting system from outside the authorized region of control. Distance bounding is limited to proving distance based on "non-modifiable" hardware tokens (like an RF smart-card) but does not consider the possibility of a relay device which could be modified to enable it to be remotely controlled.

It would be desirable to provide embodiments to counter such attack scenarios as outlined above.

According to one aspect disclosed herein, there is provided apparatus for use in a lighting system, the apparatus comprising: a device location module, a user location module and an access module. The device location module is configured to determine device location relating to a location of a wireless device, and the user location module is configured to determine user location information indicative of whether a user is accompanying the wireless device in said region. The access module is configured to selectively allow the wireless device to control the lighting system in dependence on a plurality of access rules, i.e. to grant the wireless device access to the control of the lighting system on condition of fulfilling these rules. The access rules comprise at least that: (i) to be allowed control, the wireless device's location must be determined to be within a certain spatial region associated with the lighting system; but also that (ii) the access module will withhold said allowance, i.e. will refrain from granting the wireless device access to the control of the lighting system, in response to determining that said user location information is indicative of the wireless device being unaccompanied by a user.

For example in embodiments, a localized presence sensing system may be used to validate user presence in the vicinity of the position from which a location-based control access ensues.

Hence in embodiments, the user location module may be configured to determine said user location information based on an input from at least one presence sensor. The presence sensor may be an occupancy sensor and said user location information may indicates whether or not any user is located in said region, and said determination that the wireless device is unaccompanied may comprise detecting that no user is present in said region. Alternatively, the presence sensor may be a position sensor and said user location information may comprises a particular position of a user within said region, and similarly the device location information may comprises a particular position of the wireless device within said region. In this case, the determination that the wireless device is unaccompanied may comprise detecting that the user is not located at a same position within said region as the wireless device.

In further embodiments, the presence sensor may comprise a motion sensor and said user location information may indicate whether or not motion is detected in said region. In this case the determination that the wireless device is unaccompanied may comprises detecting no motion in said region. This may be used in conjunction with or independently of the occupancy or position based embodiments above.

In another embodiment, the user device is required to respond to a challenge by a physical action that may be observed and validated by a trusted system such as the presence sensing system.

Hence in embodiments, the access module may be configured to issue a challenge into the region associated with the lighting system. The user location information may then comprises return of a response to said challenge demonstrating a human to be present in said region, or a lack of the response indicating that a human is not present—as the challenge is understandable to a human but not recognized automatically by the wireless device and/or the response is a physical action that is not performed automatically by the wireless device. In this case the determination that the wireless device is unaccompanied may comprise detecting the lack of said response.

In yet further embodiments, the user location module may comprises a timer and an input from the device location module, and the user location information may comprise a time for which the wireless device has remained in said region. In this case the determination that the wireless device is unaccompanied may comprise determining that the wireless device has remained in the region beyond a length of time such that a user is assumed not to be accompanying the wireless device (e.g. overnight).

Alternatively or additionally, the user location information may comprise information on anomalous behavior not consistent with a user located within said region, and the determination that the wireless device is unaccompanied may comprises detecting the anomalous behavior.

Generally, any of the above tests for determining whether the wireless device is unaccompanied by a user may be applied alone or in conjunction. For example, the access may only be granted on meeting a combination of two or more of the tests, or may be granted in response to meeting any one or a subset of the tests.

According to further aspects of the present disclosure, there may be provided a lighting system comprising such apparatus, and/or a corresponding computer program product for controlling a lighting system.

BRIEF DESCRIPTION OF THE DRAWINGS

To aid the understanding of the present disclosure and to show how embodiments may be put into effect, reference is made by way of example to the accompanying drawings in which:

FIG. 5 is a schematic block diagram of a lighting system of a lighting system preventing control via a rogue relay device, and FIG. 6 is a schematic block diagram showing more detail of an example controller for controlling the lighting system based on signals from the mobile user device.

DETAILED DESCRIPTION OF EMBODIMENTS

Figure 1:
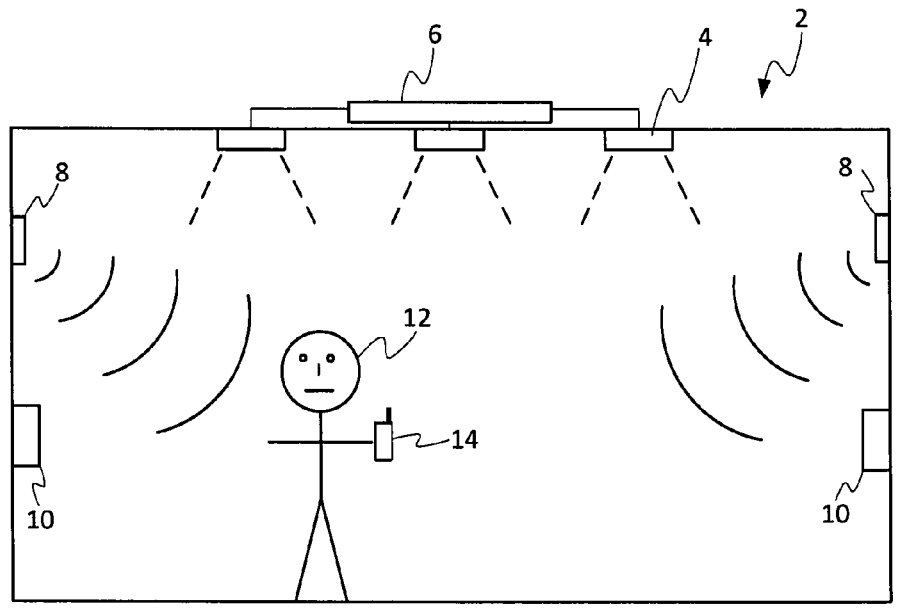
FIG. 1 is a schematic representation of an environment comprising a lighting system.

FIG. 1 illustrates an example of a lighting system installed or otherwise disposed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed or partially enclosed space such as the interior of a vehicle. By way of illustration, in the example of FIG. 1 the environment 2 in question comprises an interior space of a building.

The lighting system comprises one or more luminaires 4, each comprising one or more lamps plus any relevant fixture. Each lamp may be for example an LED-based lamp, a filament bulb or a fluorescent tube. The one or more luminaires 4 are controlled by a lighting control network 6. The lighting system also comprises a location system or network comprising one or more wireless anchor nodes 10. In embodiments the anchor nodes 10 may also have an additional function such as being access points of a wireless local area network (WLAN), e.g. a Wi-Fi-network (and hence may be "shared" components comprised by both the lighting system and another system such as a WLAN). Alternatively the anchor nodes 10 may be dedicated nodes of the location system. Also present in the environment 2 is a user 12 accompanying a wireless mobile user device 14, e.g. carrying the wireless device 14 about his or her person, or being situated in a position consistent with operating the device 14.

Figure 2:
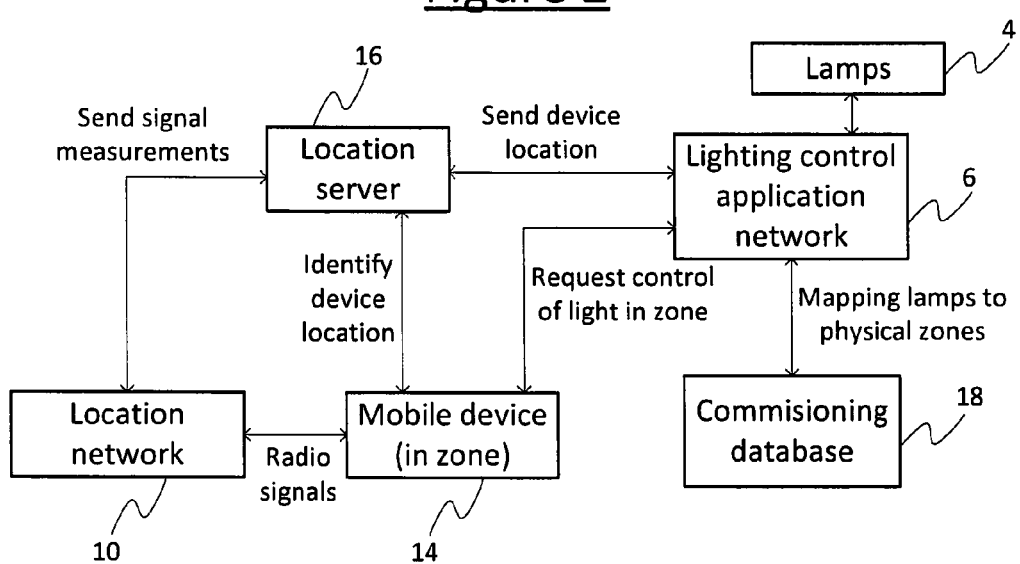
FIG. 2 is a schematic block diagram of a lighting system controlled via a mobile user device in a region associated with the lighting system.

FIG. 2 provides an overview of the system and shows the interaction of the wireless user device 14 with the location network 10 and the lighting control network 6. The lighting control network 6 may be coupled to a location server 16 for use in providing location services, as will be discussed in more detail shortly. The location server 16 may comprise one or more server units at one or more sites. This server 16 could be physically disposed in the environment 2 (e.g. coupled to the lighting network via a local wired or wireless network in the same building) or could be accessed remotely (e.g. coupled via a wider network such as the Internet). The lighting control network 6 may also be coupled to a commissioning database 18 storing a mapping between the luminaires 4 or lamps and physical (spatial) zones of the environment 2 (e.g. rooms of a building). The commissioning database 18 may also store calibration parameters and/or other settings for operating one or more of the lamps. Again, the commissioning database 18 could be physically disposed in the environment 2 (e.g. coupled to the lighting network 6 via a wired or wireless local network in the same building) or could be accessed remotely (e.g. via a wider network such as the Internet).

The wireless user device 14 and lighting control network 6 are operable to communicate wirelessly with one another. For example, in the case where the anchor nodes 10 are also wireless access points (access nodes) of a wireless local area network, e.g. Wi-Fi access points, then the lighting network 6 may be connected to the local network either directly by a wired or wireless local connection, or indirectly via wider network such as the Internet. The wireless user device 14 may then communicate with the lighting network 6 via the access/anchor nodes 10 and suitable wireless transceivers (not shown) in the device 14 and lighting network 6 respectively. Alternatively the wireless user device 14 and lighting control network 6 could be arranged to communicate via a separate channel than anchor/access nodes 10 of the location network, such as via separate dedicated RF transceivers in the device 14 and lighting network 6 respectively, or via a connection through the cellular network and Internet.

The system is arranged to determine device location information relating to the location of the wireless user device 14, and to communicate that information to the lighting control network 6 via such channels as exemplified above. Device location information may comprise an indication of whether or not a wireless device 14 is found to be within a particular spatial region, i.e. its presence or absence, e.g. within a particular room. Alternatively, the device location information may comprise a position of the wireless device 14, i.e. information narrowing down the location of the device within the spatial region in question, beyond just an indication of whether or not present in that region, e.g. narrowing down to a particular place or point within a room or other region. For example the position may comprise spatial coordinates of the wireless device 14.

The device location information may be determined by reference to the anchor nodes 10 of a location network, such as an indoor positioning system, based on one or more signals transmitted between the wireless user device 14 and one or more of the anchor nodes 10. The locations of the anchor nodes are known, e.g. being at fixed location, thus providing a known reference for determining the location of the wireless user device 14. For example the anchor locations may be stored in the location server 16.

In embodiments, the device location information may comprise an indication of whether or not the wireless device 14 is found to be within wireless range of an anchor node 10, or within a distance-bounded range, thus indicating whether the device 14 is present in or absent from a region associated with the anchor node's range or distance-bounded range. Alternatively, the device location information may comprises a position determined based on measuring a property of the signal(s) transmitted between the device 14 and one or more anchor nodes 10, such as the RSSI (receiver signal strength indicator), ToA (time of arrival) and AoA (Angle of arrival) of the signal(s) between the wireless user device 14 and the one or more anchor nodes 10. For example the device's position could be estimated based on RSSI or ToA along with the AoA of a signal transmitted between the device 14 and one or more anchor nodes 10; or could be estimated based on the RSSI or ToA and a multilateration involving multiple anchor nodes, optionally also including AoA information.

In one implementation, the location of the wireless device 14 may be determined in a "device centric" fashion, i.e. the wireless user device 14 makes the measurement(s) of one or more signals received from one or more anchor devices 10, and performs the processing to determine its own location at the wireless device 14 itself based on such measurements. The wireless user device 14 can then submit the location information to the lighting control network 6.

For example the wireless user device 14 may determine its location relative to one or more anchor nodes 10, and then look-up the location of the anchor node(s) 10 in the location database 16 to interpret that location in more absolute terms. For example this look-up may comprise mapping the anchor node 10 to an identification of a particular spatial region such as a particular room of a building, to thereby determine which room or region the wireless device 14 is found in. In another example, this look-up may comprise looking up the spatial coordinates of the node(s) 10 relative to a map, floor plan or the globe in order to combine these coordinates with the wireless user device's coordinates relative to the node(s) 10, thereby finding the coordinates of the wireless device 14 relative to the map, floor plan or the globe.

In device-centric cases, the lighting control network 6 need not necessarily have its own connection to the location server 16 (though it may do). Instead the wireless user device 14 may be provided with a connection to the location server 16, e.g. via an access point 10 or other access channel, and via a local wired or wireless connection or network and/or a wider network such as the internet. Alternatively the wireless user device 14 may submit the "raw" signal measurements or information on its relative location to the location server, and the location server 16 performs the interpretation there and passes on the resulting location information to the lighting control network 6 via the lighting control network's connection with the location server 16. Alternatively the wireless user device 14 could submit the raw signal measurements or information on its relative location to the lighting control network 6, and the lighting control network 6 could then perform the look-up based on the lighting control network's connection with the location server 16.

In another implementation, the location of the wireless device 14 may be determined in a "network centric" fashion, i.e. one or more nodes 10 of the location network takes the measurement(s) of one or more signals received from the wireless user device 14, and the processing to determine the device's location based on such measurements is performed in the location network 10 or location server 16. Again this may involve a look-up in the location database 16 to interpret the relative location in more absolute terms, in a similar manner to that discussed above.

In further implementations, the device positioning is not limited to a network of fixed anchor nodes 10. An alternative 10 would be to use a satellite based positioning system such as GPS, for determining the position of a wireless device 14 relative to a plurality of satellites.

By whatever process it is determined, the lighting network 6 uses the device location information to determine whether or not the wireless mobile device 14 is found in a certain spatially-limited region associated with the lighting system. This region may for example be a particular zone of a building such as a particular room or an area within a room, or a zone of a covered or outdoor space. E.g. the region may comprise a region illuminated by the lighting system, or may be comprised by a region illuminated by the lighting system. Alternatively or additionally the region could comprise a designated control zone outside the region being illuminated, e.g. a supervisor's office. The region in question may be a single region associated with the whole lighting system; or the lighting system could have multiple distinct regions associated with it, each served by different lighting in the form of one or more respective luminaires 4 or lamps of the lighting system (e.g. different rooms or other zones being served by different lights). In the latter case the lighting control system 6 may determine whether the wireless user device 14 is found in a particular zone associated with particular lighting, and if so which region and which lighting this corresponds to. This may be performed by reference to locations or positions in commissioning database 18.

The lighting control system 6 is configured to grant the wireless user device 14 with access to control of the lighting system on condition that it finds the wireless user device 14 to be in the appropriate spatial region. For example, the wireless user device 14 may be granted access to control of the particular luminaire(s) 4 or lamp(s) illuminating a particular area (e.g. particular room) on condition of finding that wireless device 14 to be within the respective illuminated area or possibly another authorized zone associated with the illuminated area (e.g. a supervisor's office). The lighting control system 6 may be configured to perform this determination and conditionally grant control in response to a request issued from the wireless user device 14 to the lighting control system 6 (e.g. via any of the communication example channels discussed above). Alternatively the lighting control system may poll the region or zone at intervals and grant the access automatically upon detecting a compatible user device 14.

Note that where it is said the wireless user device is granted access on condition of being found in a certain spatial region or the like, this does not necessarily preclude there being one or more additional access rules which may comprise other conditions that must be fulfilled as well. For example the one or more additional access rules may comprise a condition that the identity of the wireless device must be authenticated. In embodiments, the access rules may comprise one or more additional rules that are specifically applicable to the spatial region in question, such as an additional condition that the wireless device must be verified as having an administrator status for that spatial region.

If granted, the control may comprise one or more of a number of potential functions. The control may comprise manual control of the relevant lighting 4 by the user 12 via a user interface of the wireless user device 14. The control may comprise turning the relevant lighting 4 on or off, or dimming the lighting, and/or may comprise commissioning functions. The control may comprise storing lighting settings in a luminaire 4 or the commissioning database 18, and/or may comprise reading settings or a status report from a luminaire 4 or the commissioning database 18 (which readings may be communicated back to the device 14 via any suitable channel such as those discussed above). Where a luminaire 4 comprises more than one lamp, the control may enable control of individual lamps or may be limited to controlling the luminaire 4 as a whole. Alternatively there may be just one lamp per luminaire 4.

A particular implementation is illustrated in FIG. 2. Here, the nodes 10 of the location network take the signal measurements of signals received from the wireless device 14, and send these measurements to the location server 16 for interpretation to identify the device location. The wireless user device 14 requests access to control of the lighting from the lighting control network 6. In response, the lighting control network 6 retrieves the location information from the location server 16 and determines whether the wireless device 14 is found to be within the valid control zone, e.g. within the room whose lighting is sought to be controlled. Optionally this may be performed with reference to a mapping of zones to lighting stored in the commissioning database 18. If the wireless device 14 is found to be within the valid control region (and fulfills any other access rules applicable for that spatial region), the lighting control network 6 grants access but if not it withholds granting the access. If control is allowed, the lighting control network 6 then controls the relevant lighting 4 based on one or more control signals received from the wireless user device (which again may be communicated via any suitable channel such as those discussed above), and optionally 4 based on settings or other parameters retrieved the commissioning database 18. It will be appreciated that FIG. 2 is provided by way of illustration. The following will be described with reference to the example system of FIG. 2, but similar teachings apply in relation to other implementations such as those discussed above.

Figure 3:
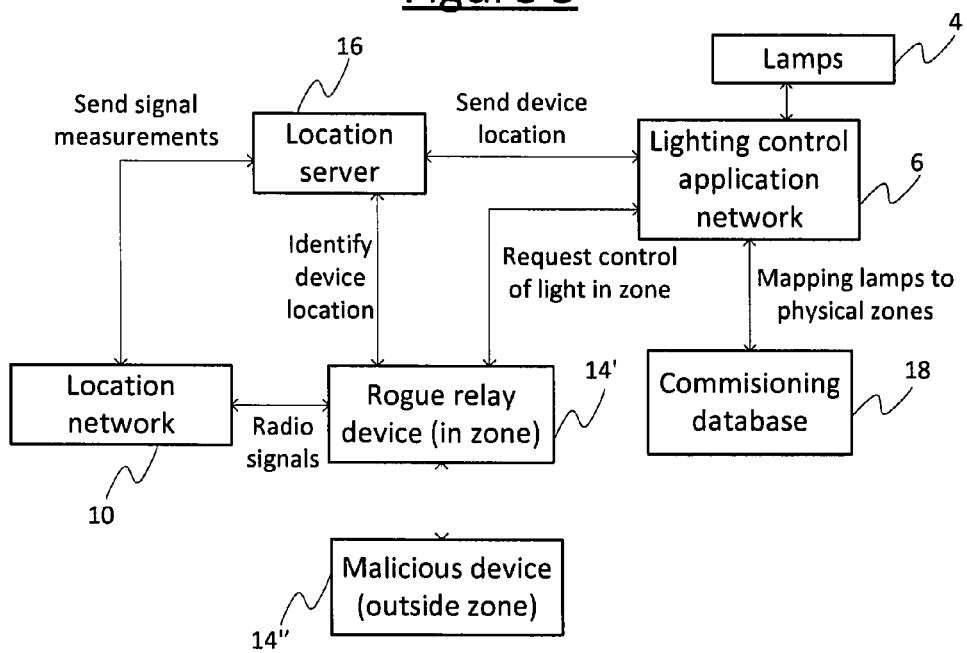
FIG. 3 is a schematic block diagram of a lighting system controlled via a rogue relay device.

FIG. 3 illustrates a security threat in the provision of access rights to a user based on the location of a wireless device 14. The components and functionality of the system are the same as FIG. 2. However, a malicious user may separate the positioning functionality of the user device from the controlling functionality. This is done by leaving a rogue relay device 14' in the control zone (e.g. room) that acts as the identified wireless device (based on location), but another user device 14" of the malicious user seeking control is actually placed at a different location outside the valid control zone (e.g. outside the relevant room). The malicious user device 14" then can control the lights by assuming the identity of the relay device 14' or remotely controlling the relay device 14' in the room or zone. Yet another possibility is that a malicious party may introduce malicious software into the located device 14' in the room or zone, which then sends out control commands (pre-programmed by the malicious user) to disrupt lighting behavior.

The following discloses a selection of exemplary embodiments for more secure provision of control access based on location information. Each of these embodiments is based on a principle of determining whether a user (a human) is, or is likely to be, accompanying a wireless device 14 or 14' in the control zone. If so, access to control of the lighting 4 may be granted, but if not the grant of access is withheld. The disclosed techniques may be applicable to any system where access is provided to a user based on location of a wireless device, e.g. in application segments like offices, retail, industry, hospitality, and outdoor.

In a first embodiment, a presence sensing system 8 is used to validate requests from a user to access the lighting control network. In one variant of the first embodiment, the presence sensing system determines binary (yes/no) occupancy of a user in the zone from which a location-based access request is received. In an alternate variant of the first embodiment, a localized presence sensing system determines a particular position of a user in the vicinity of the position from which a location-based access request is received.

In a second embodiment a challenge is issued into the control zone, which a human must respond to by performing a physical act to prove him or herself to be present, and which can be observed and validated by a trusted system.

In a third embodiment, the access provided to a device 14 is time-limited, on the basis that if a device 14' has remained too long in the control zone (e.g. overnight or for more than a time limit such as 24 hours) then it is unlikely to be accompanied by a user.

In a fourth embodiment, anomaly detection is used to recognize the non-existence of a user in a zone.

Generally, any of these embodiments for determining whether the wireless device 14 or 14' is unaccompanied by a user may be applied alone or in conjunction. For example, the access may only be granted on meeting a combination of the tests of two or more of the embodiments, or may be granted in response to meeting any one or a subset of such tests.

Figure 4:
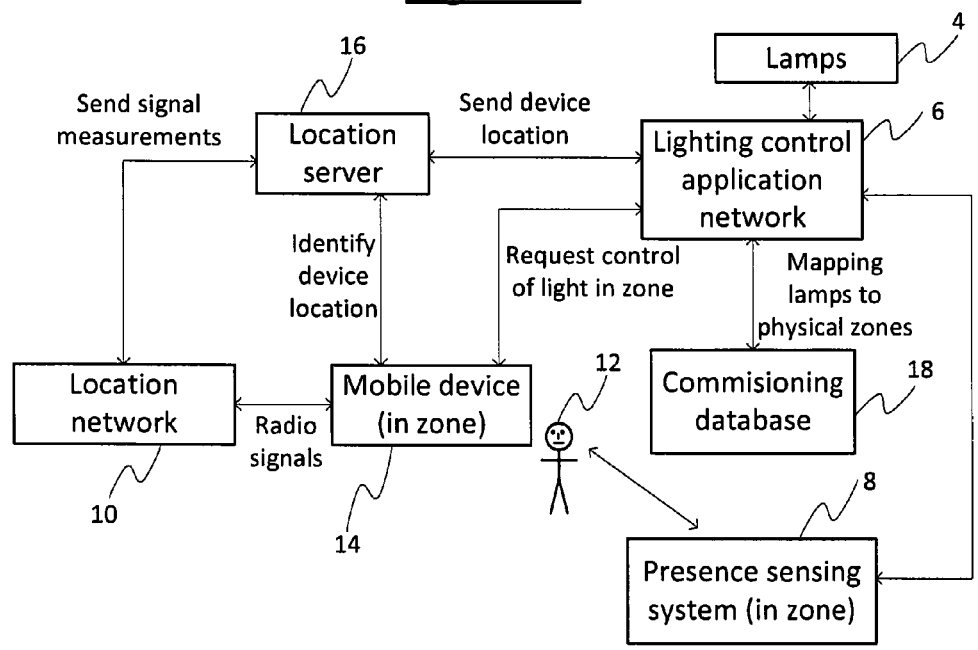
FIG. 4 is another schematic block diagram of a lighting system controlled via a mobile user device in a region associated with the lighting system.

FIGS. 4 to 6 illustrate an example environment 2 and lighting control system in accordance a first embodiment disclosed herein.

The components and functionality are similar to those discussed in relation to FIGS. 2 and 3, except for additional components and functionality to regulate access based on whether the requesting device 14 or 14' is accompanied or unaccompanied by a user 12. FIG. 4 illustrates the scenario (somewhat analogous to FIG. 2) where a legitimate wireless user device 14 is accompanied by a user 12, e.g. carrying the wireless device 14 about his or her person, or being situated in a position consistent with operating the device 14. FIG. 5 illustrates the scenario (somewhat analogous to FIG. 3) where a rogue device such as a rogue relay device 14' is left in the control zone unaccompanied by a user, e.g. with a malicious user controlling the relay device 14' remotely from a malicious device 14" outside the zone. FIG. 6 expands on more detail of the lighting control network 6 according to embodiments disclosed herein.

As shown in FIGS. 4 and 5, in the first embodiment the lighting control system is coupled to a presence sensing system 8 comprising one or more presence sensors. Lighting systems may already comprise presence sensors for automatically turning on and off or dimming lighting in dependence on whether a user is present. However, presence sensing has not previously been applied for determining whether access to control of the lighting should be granted to a wireless user device 14. According to the disclosure herein, this provides one way of determining whether a wireless device 14 or 14' is accompanied by a user and therefore whether it should be granted access or whether it is likely to be a rogue device such as a relay device.

As shown in FIG. 6, the lighting control network 6 comprises a controller 20. The controller 20 may be implemented in software stored on a computer-readable storage medium such as a magnetic or electronic medium, and arranged to be executed on a processor comprising one or more processing units. Alternatively it is not excluded that the controller 20 may be implemented wholly or partially in dedicated hardware circuitry, or configurable or re-configurable hardware circuitry such as a PGA or FPGA.

The controller 20 may be a central controller arranged to control lighting 4 in a plurality of different places such as different rooms of a building, the control in each being based on detecting location in a respective control zone. Alternatively the controller 20 may just serve the lighting associated with an individual control zone. For illustrative purposes the following will be described in terms of a particular control zone from which access to the lighting system is granted for the control of corresponding lighting associated with that zone. However, it is not excluded that the lighting system covers multiple such zones each associated with a respective portion of the lighting 4 comprising a respective one or more luminaires 4 or lamps. In that case access to control of the lighting system may be granted only for the purpose of controlling the lighting associated with the respective zone e.g. control of the lighting system is granted just for the control of lighting in the room from which the request for control is submitted. Granting access to "control of the lighting system" or the like does not necessarily imply control of the whole system or of all possible functionality.

The controller 20 comprises an access module 24, and a control module 22 configured to operate the lighting 4 in accordance with control signals from the wireless user device 14 on condition of access being granted by the access module 24 based on pre-configured access rules. The access module 24 comprises a device location module 26 and a user location module 28. The device location module 26 is configured to determine the device location information relating to a location of the wireless device 14, as discussed above in relation to FIGS. 1 and 2. The access rules applied by the access module 24 comprise a condition that the wireless device 14, 14' is within the corresponding control region or zone, as discussed above. Further, the user location module 28 is configured to determine user location information relating to a location of a user 12.

The user location information may comprise an indication as to whether or not any person is found to be present in the control zone, i.e. whether the zone is occupied or unoccupied, or an indication that the zone is likely to be unoccupied, or an indication that the zone is likely to be occupied. Alternatively the user location information may comprise a position of a user, i.e. information narrowing down the location of a user 12 within the spatial region in question, beyond just an indication of whether or not present in that region, e.g. narrowing down to a particular place or point within a room or other zone. For example the position may comprise spatial coordinates of the user 12.

The access module 24 uses such information to determine whether a wireless device 14 or 14' found within the control zone is also accompanied by a user 12 (a human). On condition that a wireless device 14 is found within the valid control zone and fulfills any other access rules applicable for that spatial region, and on condition that the wireless device is determined to be accompanied, then the access module 24 grants the wireless user device 14 with access to the relevant control of the lighting system 6, 4 via the control module 22. If either condition is not met on the other hand, the access module 22 withholds this granting of access—either by actively blocking access or by refraining from issuing a security token that grants the access. Note also that this function of the access module is not trying to verify the identity of a particular user or that a particular individual user is authorized. Rather, it is verifying whether the device 14 or 14' is accompanied by any human, as opposed to being unaccompanied in that it has been left behind by a malicious user who is not present.

In the first embodiment, the access module 24 uses an input from a presence sensing system 8 to determine whether a wireless device 14 or 14' is accompanied by a user. Thus a presence sensing system 8 that is typically already part of a lighting system can be used for an additional purpose to detect and prevent the security threat discussed above.

In one variant of the first embodiment, the presence sensing system 8 comprises a binary (yes/no) occupancy sensor. Binary occupancy sensors such as those based on PIR (passive infrared) or ultrasound are typically used in many existing lighting systems for presence detection. The occupancy sensor indicates presence or absence (of some user) within its detection region. This region may be defined by the sensor's range or by distance bounding (e.g. based on signal strength or time-of flight of an ultrasound pulse). According to embodiments of the present disclosure, the occupancy sensor may additionally be used to detect the security threat in the case that a rogue device 14' is in the room or control zone, but the malicious user is outside the room or zone, since in this case no occupancy is detected. In this case, when the location network 10, 16 locates the rogue device 14' within its valid region, the access module 24 makes a query to the occupancy sensing system 8. Only if occupancy is determined, control access is provided to the requesting user device 14.

However the above does not work if there is another user is in the room. This issue may be addressed by using one or more localizing presence sensors, such as an ultrasonic array sensor which can be used to determine a position of a user within a region. This type of presence sensor is disclosed in WO 2011/151796. Thus in an alternative variant of the first embodiment, a localizing presence sensing system 8 comprising localizing presence sensors is used to counter the security threat. When a device 14 or 14' is positioned by the location network 10, 16 the location network provides the position coordinates to the access module 24 for comparison with information on the user 12 from the localizing presence sensing system 8. This information may comprise a position of the user, e.g. in terms of spatial coordinates 12. Thus the access module 24 can check whether a user 12 is found at the same position as the module device 14 requesting access. Note that "same position" or the like does not require the device 14 to be within a user's body the user 12 and device 14 may be considered to be at the same location if their relative positions are consistent with the user carrying or using the user device 14.

Alternatively or additionally, the presence sensing system 8 may be used to check whether there is user movement, either in the control zone generally or specifically at the position of the device 14. If a user movement is determined, then control access is provided to the requesting user device 14 at that position; if not, control access is denied.

While the above has been described in terms of certain sensors such as PIR or ultrasound sensors, alternatively or additionally it is possible to use other sensor modalities which make a measurement that can be associated with a human. Examples include CO2 sensors, temperature sensors, etc. The term "presence sensor" alone is not intended to be limiting in this respect.

In a second embodiment, the access module 24 is configured to issue a challenge into the relevant region or zone, challenging a user to prove human presence. The challenge is issued only into the valid control zone exclusive of anywhere outside that zone, or at least selectively into that region in discrimination of regions outside. Further, the challenge can only be understood and/or responded to by a human user and cannot be simulated by a rogue device 14'.

The challenge may be of a form that a device 14' cannot interpret automatically. For example the challenge may comprise an audio message played out into the zone (e.g. room), only being substantially audible within that zone or room. As another example, the challenge may comprise a human readable image such as text displayed on a screen in the room or zone, not visible outside. Another example would be an audible message or human-readable image sent from the lighting system 6 to the wireless device 14 (via any suitable channel such as those discussed above) to be played out or displayed via the wireless device 14, e.g. text styled to resist automatic recognition such as the style used to distinguish internet bots from humans remotely on the internet.

To determine information on the location of the user requesting access control, the user 12 is thus challenged to perform a physical action in response via the controlling device 14. This can observed by a trusted user location module of the control system 6, and the user can thereby demonstrate him or herself to be present. The action in response to the challenge may comprise repeating the challenge verbatim, or performing some other correct action instructed by the challenge or otherwise derived by a human from the challenge. The action may be pre-defined for all users and locations, or a pre-defined action for different users or for different locations. Furthermore, the action could be independent of user or location but randomly chosen by the user location module and informed to the user through the wireless user device 14. This action has to be performed for the user location module to receive the response that is expected. The action may be a physical action that cannot be performed automatically by a wireless device 14'. Such physical actions may comprise moving the mobile in three-dimensional space or pressing a button sequence on one or more trusted devices (like a beamer) in the room. The response may be submitted back through a signal from the wireless user device 14 (via any suitable channel such as those discussed above), or through a separate user interface installed in the room or zone such as a console or speech recognition system.

Again note that the system is not authorizing or verifying identity of a particular user, but rather checking that any human is present with the device 14.

A third embodiment is based on time limited access being granted to the device 14 or 14'.

In this embodiment, the user location module comprises a timer and an input for receiving information on when the wireless device 14 or 14' has been found within the room or control zone. The wireless device 14 or 14' is allowed to control the room only for a specified duration after it has been detected to have entered the relevant zone. Further, the wireless device 14 may be required to prove that it entered the region or left it at least once per specified time interval. This prevents a relay device 14' being left behind, that could otherwise control the lighting system for unlimited time. If a device 14 remains in the same zone or same position for longer than a threshold point in time or time period, this may be taken as indicative of the fact that it is unlikely to be accompanied by a user. Example thresholds would be 12 hours, 18 hours, 24 hours, 36 hours, 48 hours, or overnight. In further embodiments, to prove the device 14 has entered or left the room, the user location system may track the device 14 as it moves from or towards any of the known entrances of the room.

A fourth embodiment is based on anomaly detection techniques. Here the user location module of the lighting control system 6 performs additional checks based on pre-defined rules or from learning normal operational behavior from the past. If it detects anomalous behavior not consistent with the way a legitimate user present in the room or zone would likely use the lighting system, this may be taken as indicative of the fact that the wireless device 14' signaling the control is unlikely to be that of a legitimate user present in the room or zone. Examples of such rules may comprise disallowing access if a device 14' attempts to completely switch off the lights when presence of users in the room is known to the lighting system, and/or disallowing access in response if a device 14' attempts to switch lights on and off or vary the dimming of lights back and forth at greater than a threshold rate. Additional information on the status or use of other equipment (like a beamer) could be used to identify anomaly in the commands sent to the lighting system.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for use in a lighting system, the apparatus comprising:
    a device location module configured to determine device location information relating to a location of a wireless device;
    a user location module configured to determine user location information indicative of whether a user is accompanying the wireless device in a spatial region associated with the lighting system; and
    an access module configured to allow the wireless device to control the lighting system in dependence on a plurality of access rules, the access rules comprising at least that: (i) the allowance is conditional on the wireless device being determined, based on said device location information, to be within said spatial region associated with the lighting system, and (ii) said allowance will be withheld in response to determining that said user location information is indicative of the wireless device being unaccompanied by a user.

2. The apparatus of claim 1, wherein the user location module is configured to determine said user location information based on an input from at least one presence sensor.

3. The apparatus of claim 2, wherein the at least one presence sensor is an occupancy sensor and said user location information indicates whether or not any user is located in said region, and wherein said determination that the wireless device is unaccompanied comprises detecting that no user is present in said region.

4. The apparatus of claim 2, wherein the at least one presence sensor is a position sensor and said user location information comprises a position of a user within said region, wherein the device location information comprises a position of the wireless device within said region, and wherein said determination that the wireless device is unaccompanied comprises detecting that the user is not located at a same position within said region as the wireless device.

5. The apparatus of claim 2, wherein the presence sensor comprises a motion sensor and said user location information indicates whether or not motion is detected in said region, and wherein said determination that the wireless device is unaccompanied comprises detecting lack of motion in said region.

6. The apparatus of claim 1, wherein:
    the access module is configured to issue a challenge into the region associated with the lighting system;
    said user location information comprises return of a response to said challenge demonstrating a human to be present in said region, or a lack of the response indicating that a human is not present, the challenge being understandable to a human but not recognized automatically by the wireless device and/or the response comprising a physical action that is not performed automatically by the wireless device; and
    wherein said determination that the wireless device is unaccompanied comprises detecting the lack of said response.

7. The apparatus of claim 1, wherein the user location module comprises a timer and an input from the device location module, wherein the user location information comprises a time for which the wireless device has remained in said region, and wherein said determination that the wireless device is unaccompanied comprises determining that the wireless device has remained in the region beyond a length of time such that a user is assumed not to be accompanying the wireless device.

8. The apparatus of claim 1, wherein the user location information comprises information on anomalous behavior not consistent with a user located within said region, and wherein said determination that the wireless device is unaccompanied comprises detecting the anomalous behavior.

9. The apparatus of claim 1, wherein said spatial region comprises a region illuminated by the lighting system, or is comprised by a region illuminated by the lighting system.

10. The apparatus of claim 1, wherein the device location module is configured to determine the device location information from one or more fixed anchor nodes of a location network.

11. The apparatus of claim 1, wherein the device location module is configured to determine the device location information from an indoor positioning system.

12. A controller comprising the apparatus according to claim 1, and a control module configured to enact said control by operating one or more luminaires of the lighting system based on control signals from the wireless user device, if the control is allowed by the access module.

13. A lighting system comprising the controller of claim 12 and the one or more luminaires.

14. A lighting system comprising:
    one or more luminaires;
    a control module for controlling the lighting system by operating the one or more luminaires;
    a device location module configured to determine device location relating to a location of a wireless device;
    a user location module configured to determine user location information indicative of whether a user is accompanying the wireless device in a spatial region associated with the lighting system;
    an access module configured to allow the wireless device to control the lighting system in dependence on a plurality of access rules, the access rules comprising at least that: (i) the allowance is conditional on the wireless device being determined, based on said device location, to be within said spatial region associated with the lighting system, and (ii) said allowance will be withheld in response to determining that said user location information is indicative of the wireless device being unaccompanied by a user.

15. A computer program product for securing control of a lighting system, the computer program product comprising code embodied on a non-transitory computer-readable storage medium and configured so as when executed on a processor to perform operations of:
- determining device location relating to a location of a wireless device;
- determining user location information indicative of whether a user is accompanying the wireless device in a spatial region associated with the lighting system; and
- allowing the wireless device to control the lighting system in dependence on a plurality of access rules, the access rules comprising at least that: (i) the allowance is conditional on the wireless device being determined, based on said device location, to be within said region, and (ii) said allowance will be withheld in response to determining that said user location information is indicative of the wireless device being unaccompanied by a user.

* * * * *